United States Patent
Mejdrich et al.

(10) Patent No.: US 9,495,724 B2
(45) Date of Patent: Nov. 15, 2016

(54) SINGLE PRECISION VECTOR PERMUTE IMMEDIATE WITH "WORD" VECTOR WRITE MASK

(75) Inventors: Eric Oliver Mejdrich, Rochester, MN (US); Adam James Muff, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1076 days.

(21) Appl. No.: 11/554,794

(22) Filed: Oct. 31, 2006

(65) Prior Publication Data

US 2008/0114824 A1    May 15, 2008

(51) Int. Cl.
*G06T 1/60* (2006.01)
*G06F 9/30* (2006.01)

(52) U.S. Cl.
CPC ............ *G06T 1/60* (2013.01); *G06F 9/30032* (2013.01); *G06F 9/30036* (2013.01)

(58) Field of Classification Search
CPC ................... G06F 9/30032; G06F 9/30036
USPC .................... 708/200–209; 712/300
See application file for complete search history.

(56) References Cited

U.S. PATENT DOCUMENTS

| | | | |
|---|---|---|---|
| 5,311,459 A | 5/1994 | D'Luna et al. | |
| 5,506,865 A | 4/1996 | Weaver, Jr. | |
| 5,669,012 A * | 9/1997 | Shimizu et al. | 712/1 |
| 5,742,780 A | 4/1998 | Caulk, Jr. | |
| 5,764,939 A * | 6/1998 | Caulk, Jr. | 708/491 |
| 5,793,661 A | 8/1998 | Dulong et al. | |
| 5,859,789 A | 1/1999 | Sidwell | |
| 5,983,257 A | 11/1999 | Dulong et al. | |
| 5,987,490 A | 11/1999 | Alidina et al. | |
| 5,996,066 A * | 11/1999 | Yung | 712/221 |
| 6,115,812 A | 9/2000 | Abdallah et al. | |
| 6,128,726 A | 10/2000 | LeComec | |
| 6,209,123 B1 * | 3/2001 | Maziasz et al. | 716/14 |
| 6,557,022 B1 | 4/2003 | Sih et al. | |
| 6,564,238 B1 * | 5/2003 | Kim et al. | 708/513 |
| 7,062,526 B1 | 6/2006 | Hoyle | |
| 7,072,929 B2 | 7/2006 | Pechanek et al. | |
| 7,414,625 B1 | 8/2008 | Rodriguez et al. | |
| 7,509,602 B2 * | 3/2009 | Ganesan et al. | 716/4 |
| 7,631,170 B2 * | 12/2009 | Dowling | 712/225 |
| 7,689,641 B2 * | 3/2010 | Abel et al. | 708/620 |
| 2002/0166098 A1 * | 11/2002 | Chang et al. | 716/1 |
| 2003/0084083 A1 | 5/2003 | Hull et al. | |
| 2003/0105945 A1 * | 6/2003 | Wolff et al. | 712/224 |
| 2004/0230632 A1 | 11/2004 | Buchert et al. | |

(Continued)

*Primary Examiner* — Chuong D Ngo
(74) *Attorney, Agent, or Firm* — Patterson + Sheridan, LLP

(57) ABSTRACT

The present invention is generally related to the field of image processing, and more specifically to an instruction set for processing images. Vector processing may involve performing a plurality of permute operations to arrange vector operands in desired locations of a register prior to performing vector operation, for example, a cross product. The permute instructions may be dependent on one another and may require the use of temporary registers. Embodiments of the invention provide a permute instruction wherein a mask field may be used to specify a particular location of a target register in which to transfer data, thereby reducing the number of instructions for arranging data, reducing dependencies between instructions, and the usage of temporary registers.

20 Claims, 9 Drawing Sheets

(56) References Cited

U.S. PATENT DOCUMENTS

| | | |
|---|---|---|
| 2005/0071413 A1 | 3/2005 | Schulte et al. |
| 2005/0071415 A1 | 3/2005 | Taunton |
| 2005/0125647 A1* | 6/2005 | Symes et al. .................. 712/300 |
| 2006/0149804 A1* | 7/2006 | Luick et al. ................... 708/626 |
| 2008/0034357 A1* | 2/2008 | Gschwind ..................... 717/149 |
| 2008/0071851 A1 | 3/2008 | Zohar et al. |
| 2008/0114824 A1 | 5/2008 | Mejdrich et al. |

\* cited by examiner

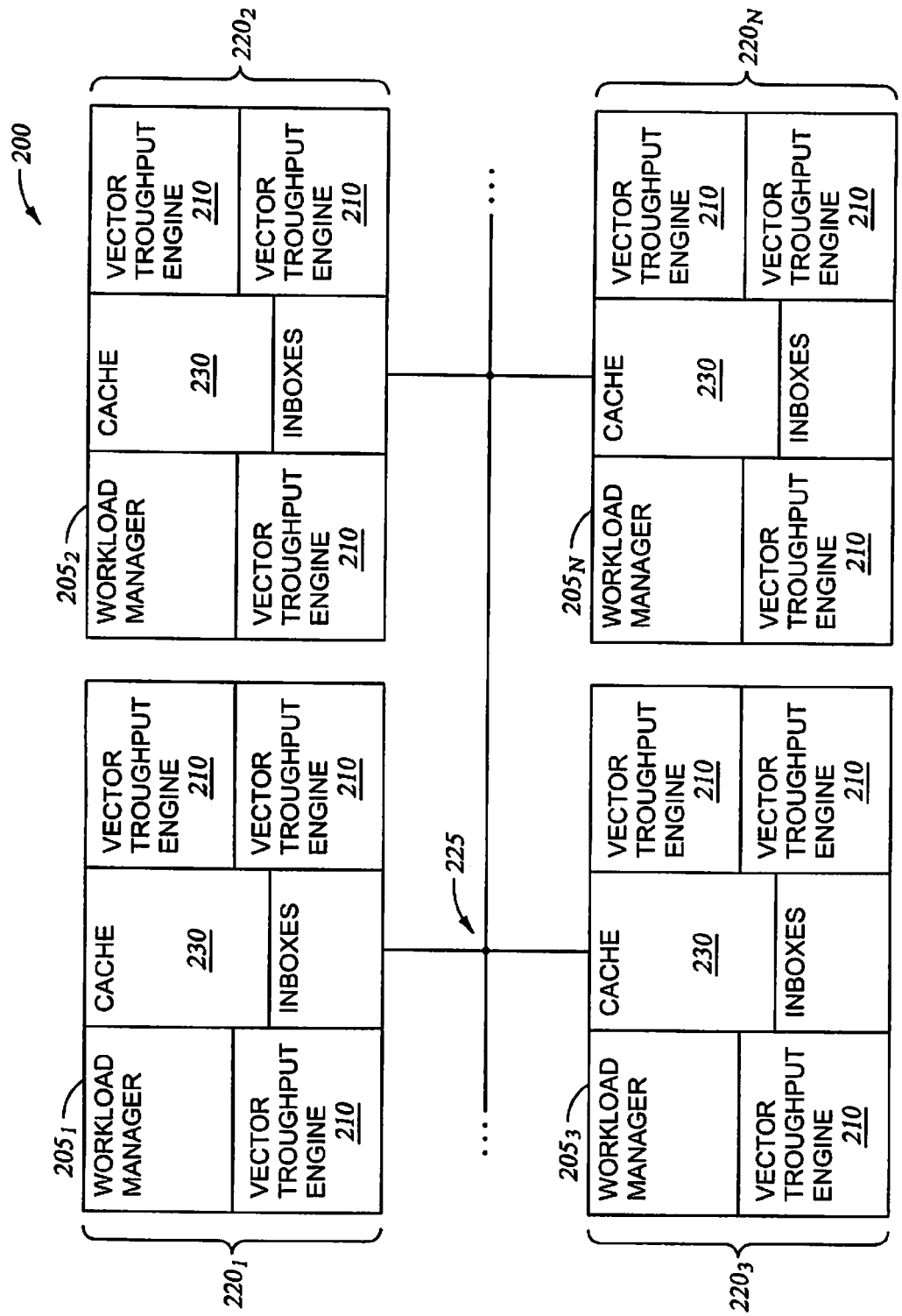

$$A = (x_a, y_a, z_a)$$
$$B = (x_b, y_b, z_b)$$

$$N = A \times B = \begin{vmatrix} \hat{x} & \hat{y} & \hat{z} \\ x_a & y_a & z_a \\ x_b & y_b & z_b \end{vmatrix} = \begin{matrix} \hat{x}(y_a z_b - y_b z_a) + \\ \hat{y}(x_b z_a - x_a z_b) + \\ \hat{z}(x_a y_b - x_b y_a) \end{matrix}$$

Fig. 9A

|    | WORD 0 | WORD 1 | WORD 2 | WORD 3 |
|----|--------|--------|--------|--------|
| $R_A$ | $x_a$ | $y_a$ | $z_a$ | XX |
| $R_B$ | $x_b$ | $y_b$ | $z_b$ | XX |
| $R_C$ | $x_c$ | $y_c$ | $z_c$ | XX |

Fig. 9B

|    | WORD 0 | WORD 1 | WORD 2 | WORD 3 |
|----|--------|--------|--------|--------|
| $R_1$ | $z_a$ |       |       |       |
| $R_2$ |       |       |       |       |
| $R_3$ |       |       | $y_a$ |       |
| $R_4$ |       |       |       | $x_b$ |
| $R_5$ |       | $z_b$ |       |       |
| $R_6$ | $y_b$ |       |       |       |
| $R_7$ |       |       |       | $x_a$ |

| INSTRUCTION | DESCRIPTION |
|---|---|
| 1001 — PERMUTE INSTRUCTION 1 | MOVE $z_a$ TO REGISTER $T_1$ |
| 1002 — PERMUTE INSTRUCTION 2 | MOVE $y_a$ TO REGISTER $T_2$ |
| 1003 — PERMUTE INSTRUCTION 3 | MOVE $x_a$ TO REGISTER $T_3$ |
| 1004 — MERGE INSTRUCTION 4 | MERGE CONTENTS OF $T_2$ & $T_3$ INTO $R_A$ |
| 1005 — MERGE INSTRUCTION 5 | MERGE $R_A$ & $T_1$ |

*Fig. 10*

| 1101 | 1102 | 1103 | 1104 | 1105 |
|---|---|---|---|---|
| OPLC | $R_S$ | $R_T$ | $R_D$ | MASK |

```
                                    1210
                                    /
1201 —  PERMUTE  1   R_1 , R_A , 0010
1202 —  PERMUTE  2   R_3 , R_A , 0100
1203 —  PERMUTE  3   R_7 , R_A , 1000
```

*Fig. 12*

SINGLE PRECISION VECTOR PERMUTE IMMEDIATE WITH "WORD" VECTOR WRITE MASK

CROSS-REFERENCE TO RELATED APPLICATIONS

This application is related to U.S. patent application Ser. No. 11/554,774, entitled Single Precision Vector Dot Product with "Word" Vector Write Mask filed Oct. 31, 2006, by Mejdrich et al. This related patent application is herein incorporated by reference in its entirety.

BACKGROUND OF THE INVENTION

1. Field of the Invention

The present invention is generally related to the field of image processing, and more specifically to an instruction set for processing images.

2. Description of the Related Art

The process of rendering two-dimensional images from three-dimensional scenes is commonly referred to as image processing. A particular goal of image rendering is to make two-dimensional simulations or renditions of three-dimensional scenes as realistic as possible. This quest for rendering more realistic scenes has resulted in an increasing complexity of images and innovative methods for processing the complex images.

Two-dimensional images representing a three-dimensional scene are typically displayed on a monitor or some type of display screen. Modern monitors display images through the use of pixels. A pixel is the smallest area of space which can be illuminated on a monitor. Most modern computer monitors use a combination of hundreds of thousands or millions of pixels to compose the entire display or rendered scene. The individual pixels are arranged in a grid pattern and collectively cover the entire viewing area of the monitor. Each individual pixel may be illuminated to render a final picture for viewing.

One method for rendering a real world three-dimensional scene onto a two-dimensional monitor using pixels is called rasterization. Rasterization is the process of taking a two-dimensional image represented in vector format (mathematical representations of geometric objects within a scene) and converting the image into individual pixels for display on the monitor. Rasterization is effective at rendering graphics quickly and using relatively low amounts of computational power; however, rasterization suffers from some drawbacks. For example, rasterization often suffers from a lack of realism because it is not based on the physical properties of light, rather rasterization is based on the shape of three-dimensional geometric objects in a scene projected onto a two dimensional plane. Furthermore, the computational power required to render a scene with rasterization scales directly with an increase in the complexity of objects in the scene to be rendered. As image processing becomes more realistic, rendered scenes become more complex. Therefore, rasterization suffers as image processing evolves, because rasterization scales directly with complexity.

Another method for rendering a real world three-dimensional scene onto a two-dimensional monitor using pixels is called ray tracing. The ray tracing technique traces the propagation of imaginary rays, which behave similar to rays of light, into a three-dimensional scene which is to be rendered onto a computer screen. The rays originate from the eye(s) of a viewer sitting behind the computer screen and traverse through pixels, which make up the computer screen, towards the three-dimensional scene. Each traced ray proceeds into the scene and may intersect with objects within the scene. If a ray intersects an object within the scene, properties of the object and several other contributing factors, for example, the effect of light sources, are used to calculate the amount of color and light, or lack thereof, the ray is exposed to. These calculations are then used to determine the final color of the pixel through which the traced ray passed.

The process of tracing rays is carried out many times for a single scene. For example, a single ray may be traced for each pixel in the display. Once a sufficient number of rays have been traced to determine the color of all of the pixels which make up the two-dimensional display of the computer screen, the two dimensional synthesis of the three-dimensional scene can be displayed on the computer screen to the viewer.

Ray tracing typically renders real world three dimensional scenes with more realism than rasterization. This is partially due to the fact that ray tracing simulates how light travels and behaves in a real world environment, rather than simply projecting a three dimensional shape onto a two dimensional plane as is done with rasterization. Therefore, graphics rendered using ray tracing more accurately depict on a monitor what our eyes are accustomed to seeing in the real world.

Furthermore, ray tracing also handles increasing scene complexity better than rasterization. Ray tracing scales logarithmically with scene complexity. This is due to the fact that the same number of rays may be cast into a scene, even if the scene becomes more complex. Therefore, ray tracing does not suffer in terms of computational power requirements as scenes become more complex unlike rasterization.

However, one major drawback of ray tracing is the large number of floating point calculations, and thus increased processing power, required to render scenes. This leads to problems when fast rendering is needed, for example, when an image processing system is to render graphics for animation purposes such as in a game console. Due to the increased computational requirements for ray tracing it is difficult to render animation quickly enough to seem realistic (realistic animation is approximately twenty to twenty-four frames per second).

Image processing using, for example, ray tracing, may involve performing both vector and scalar math. Accordingly, hardware support for image processing may include vector and scalar units configured to perform a wide variety of calculations. The vector and scalar operations, for example, may trace the path of light through a scene, or move objects within a three-dimensional scene. A vector unit may perform operations, for example, dot products and cross products, on vectors related to the objects in the scene. A scalar unit may perform arithmetic operations on scalar values, for example, addition, subtraction, multiplication, division, and the like.

The vector and scalar units may be pipelined to improve performance. However, performing vector operations may involve performing multiple iterations of multiple instructions which may be dependent on each other. Such dependencies between instructions may reduce the efficiency of the pipelined units. For example, several pipeline stages may be left unused in order for a first instruction to complete prior to execution of a second instruction.

Furthermore, each vector unit may be coupled with a register file comprising the vector data processed by the vector unit. The vector data may be contained in one or more locations in one or more registers. Therefore, one or more instructions may be issued to rearrange the vector data in desired locations within a target register. The multiple instructions rearranging vector data may limit the efficiency of vector processing by consuming a significant portion of the issue bandwidth. Additionally, the one or more instructions rearranging vector data may be dependent on one another, thereby introducing further pipeline stalls and unused pipeline stages that further limit efficiency.

Moreover, rearranging vector data may require the use of multiple temporary registers. The use of large numbers of temporary registers introduces yet another inefficiency because it requires the construction of large register files that consume valuable space and limit processing of vector data based on the availability of registers.

Therefore, what is needed are more efficient methods, systems, and articles of manufacture for processing vector data.

SUMMARY OF THE INVENTION

The present invention is generally related to the field of image processing, and more specifically to an instruction set for processing images.

One embodiment of the invention provides a method for storing data in a target register. The method generally comprises receiving a permute instruction specifying at least one source register, the target register, and a write mask, wherein the write mask identifies one or more locations of the target register for writing data, and in response to receiving the permute instruction, transferring data from at least one location of the at least one source register to the one or more locations of the target register identified by the write mask.

Another embodiment of the invention provides a method for assembling data in a target register. The method generally comprises generating a plurality of permute instructions, each permute instruction specifying at least one source register and the target register, setting a mask field in each of the plurality of permute instructions, wherein the mask field identifies one or more locations of the target register for receiving data from the source register, and executing the permute instructions to assemble data from the source registers to the locations in the target register identified by the mask field.

Yet another embodiment of the invention provides a system, comprising a plurality of processors communicably coupled with one another. Each processor generally comprises a register file comprising a plurality of registers, and at least one vector unit. The vector unit is generally configured to receive a permute instruction specifying at least one source register, a target register, and a write mask, the write mask identifying one or more locations in the target register, and execute the permute instruction by transferring data from at least one location of the at least one source register to the one or more locations of the target register identified by the write mask.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 2 illustrates a multiple core processing element network, according to an embodiment of the invention.

FIG. 9A illustrates an exemplary registers according to an embodiment of the invention.

FIG. 9B illustrates an exemplary register file according to an embodiment of the invention.

FIG. 10 illustrates an exemplary instruction stream for adding two vectors, according to an embodiment of the invention.

FIG. 11 illustrates an exemplary permute instruction according to an embodiment of the invention.

FIG. 12 illustrates another exemplary instruction stream according to an embodiment of the invention.

DETAILED DESCRIPTION OF THE PREFERRED EMBODIMENTS

The present invention is generally related to the field of image processing, and more specifically to an instruction set for processing images. Vector processing may involve performing a plurality of permute operations to arrange vector operands in desired locations of a register prior to performing vector operation, for example, a cross product. The permute instructions may be dependent on one another and may require the use of temporary registers. Embodiments of the invention provide a permute instruction wherein a mask field may be used to specify a particular location of a target register in which to transfer data, thereby reducing the number of instructions for arranging data, reducing dependencies between instructions, and the usage of temporary registers.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

An Exemplary Processor Layout and Communications Network

Figure 1:
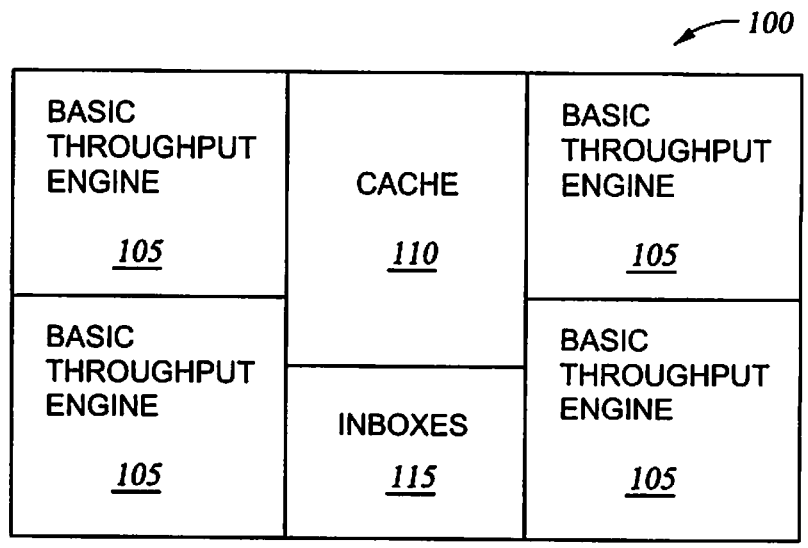
FIG. 1 illustrates a multiple core processing element, according to one embodiment of the invention.

FIG. 1 illustrates an exemplary multiple core processing element 100, in which embodiments of the invention may be implemented. The multiple core processing element 100 includes a plurality of basic throughput engines 105 (BTEs). A BTE 105 may contain a plurality of processing threads and a core cache (e.g., an L1 cache). The processing threads located within each BTE may have access to a shared multiple core processing element cache 110 (e.g., an L2 cache).

The BTEs 105 may also have access to a plurality of inboxes 115. The inboxes 115 may be a memory mapped address space. The inboxes 115 may be mapped to the processing threads located within each of the BTEs 105. Each thread located within the BTEs may have a memory mapped inbox and access to all of the other memory mapped inboxes 115. The inboxes 115 make up a low latency and high bandwidth communications network used by the BTEs 105.

The BTEs may use the inboxes 115 as a network to communicate with each other and redistribute data processing work amongst the BTEs. For some embodiments, separate outboxes may be used in the communications network, for example, to receive the results of processing by BTEs 105. For other embodiments, inboxes 115 may also serve as outboxes, for example, with one BTE 105 writing the results of a processing function directly to the inbox of another BTEs 105 that will use the results.

The aggregate performance of an image processing system may be tied to how well the BTEs can partition and redistribute work. The network of inboxes 115 may be used to collect and distribute work to other BTEs without corrupting the shared multiple core processing element cache 110 with BTE communication data packets that have no frame to frame coherency. An image processing system which can render many millions of triangles per frame may include many BTEs 105 connected in this manner.

In one embodiment of the invention, the threads of one BTE 105 may be assigned to a workload manager. An image processing system may use various software and hardware components to render a two dimensional image from a three dimensional scene. According to one embodiment of the invention, an image processing system may use a workload manager to traverse a spatial index with a ray issued by the image processing system. A spatial index may be implemented as a tree type data structure used to partition a relatively large three dimensional scene into smaller bounding volumes. An image processing system using a ray tracing methodology for image processing may use a spatial index to quickly determine ray-bounding volume intersections. In one embodiment of the invention, the workload manager may perform ray-bounding volume intersection tests by using the spatial index.

In one embodiment of the invention, other threads of the multiple core processing element BTEs 105 on the multiple core processing element 100 may be vector throughput engines. After a workload manager determines a ray-bounding volume intersection, the workload manager may issue (send), via the inboxes 115, the ray to one of a plurality of vector throughput engines. The vector throughput engines may then determine if the ray intersects a primitive contained within the bounding volume. The vector throughput engines may also perform operations relating to determining the color of the pixel through which the ray passed.

FIG. 2 illustrates a network of multiple core processing elements 200, according to one embodiment of the invention. FIG. 2 also illustrates one embodiment of the invention where the threads of one of the BTEs of the multiple core processing element 100 is a workload manager 205. Each multiple core processing element $220_{1-N}$ in the network of multiple core processing elements 200 may contain one workload manager $205_{1-N}$, according to one embodiment of the invention. Each processor 220 in the network of multiple core processing elements 200 may also contain a plurality of vector throughput engines 210, according to one embodiment of the invention.

The workload managers $220_{1-N}$ may use a high speed bus 225 to communicate with other workload managers $220_{1-N}$ and/or vector throughput engines 210 of other multiple core processing elements 220, according to one embodiment of the invention. Each of the vector throughput engines 210 may use the high speed bus 225 to communicate with other vector throughput engines 210 or the workload managers 205. The workload manager processors 205 may use the high speed bus 225 to collect and distribute image processing related tasks to other workload manager processors 205, and/or distribute tasks to other vector throughput engines 210. The use of a high speed bus 225 may allow the workload managers $205_{1-N}$ to communicate without affecting the caches 230 with data packets related to workload manager 205 communications.

An Exemplary Three Dimensional Scene

Figure 3:
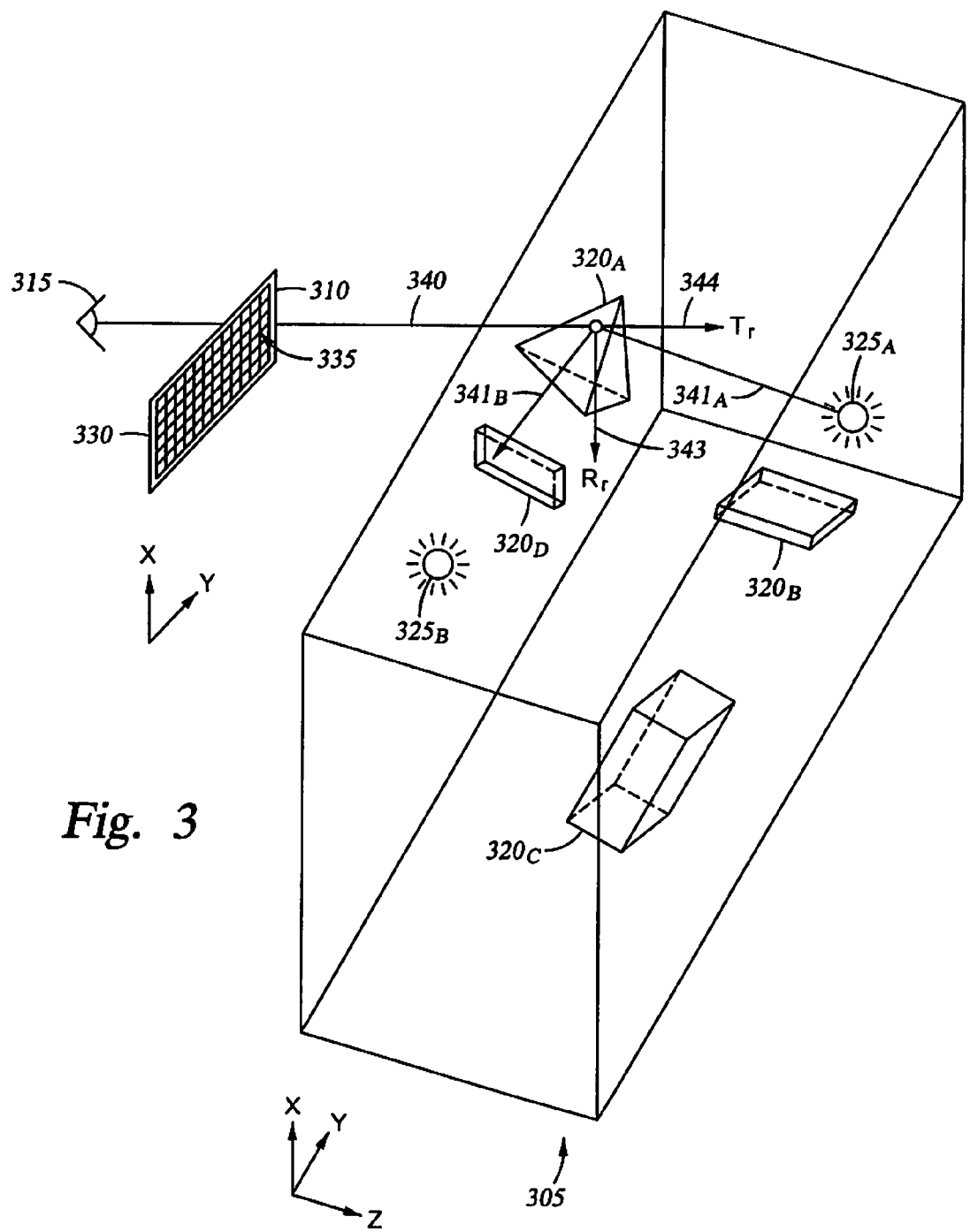
FIG. 3 is an exemplary three dimensional scene to be rendered by an image processing system, according to one embodiment of the invention.

FIG. 3 is an exemplary three dimensional scene 305 to be rendered by an image processing system. Within the three dimensional scene 305 may be objects 320. The objects 320 in FIG. 3 are of different geometric shapes. Although only four objects 320 are illustrated in FIG. 3, the number of objects in a typical three dimensional scene may be more or less. Commonly, three dimensional scenes will have many more objects than illustrated in FIG. 3.

As can be seen in FIG. 3 the objects are of varying geometric shape and size. For example, one object in FIG. 3 is a pyramid $320_A$. Other objects in FIG. 3 are boxes $320_{B-D}$. In many modern image processing systems objects are often broken up into smaller geometric shapes (e.g., squares, circles, triangles, etc.). The larger objects are then represented by a number of the smaller simple geometric shapes. These smaller geometric shapes are often referred to as primitives.

Also illustrated in the scene 305 are light sources $325_{A-B}$. The light sources may illuminate the objects 320 located within the scene 305. Furthermore, depending on the location of the light sources 325 and the objects 320 within the scene 305, the light sources may cause shadows to be cast onto objects within the scene 305.

The three dimensional scene 305 may be rendered into a two-dimensional picture by an image processing system. The image processing system may also cause the two-dimensional picture to be displayed on a monitor 310. The monitor 310 may use many pixels 330 of different colors to render the final two-dimensional picture.

One method used by image processing systems to render a three-dimensional scene 320 into a two dimensional picture is called ray tracing. Ray tracing is accomplished by the image processing system "issuing" or "shooting" rays from the perspective of a viewer 315 into the three-dimensional scene 320. The rays have properties and behavior similar to light rays.

One ray 340, that originates at the position of the viewer 315 and traverses through the three-dimensional scene 305, can be seen in FIG. 3. As the ray 340 traverses from the viewer 315 to the three-dimensional scene 305, the ray 340 passes through a plane where the final two-dimensional picture will be rendered by the image processing system. In FIG. 3 this plane is represented by the monitor 310. The point the ray 340 passes through the plane, or monitor 310, is represented by a pixel 335.

As briefly discussed earlier, most image processing systems use a grid 330 of thousands (if not millions) of pixels to render the final scene on the monitor 310. Each individual pixel may display a different color to render the final composite two-dimensional picture on the monitor 310. An image processing system using a ray tracing image processing methodology to render a two dimensional picture from a three-dimensional scene will calculate the colors that the issued ray or rays encounters in the three dimensional scene. The image processing scene will then assign the colors encountered by the ray to the pixel through which the ray passed on its way from the viewer to the three-dimensional scene.

The number of rays issued per pixel may vary. Some pixels may have many rays issued for a particular scene to be rendered. In which case the final color of the pixel is determined by the each color contribution from all of the rays that were issued for the pixel. Other pixels may only have a single ray issued to determine the resulting color of the pixel in the two-dimensional picture. Some pixels may not have any rays issued by the image processing system, in which case their color may be determined, approximated or assigned by algorithms within the image processing system.

To determine the final color of the pixel 335 in the two dimensional picture, the image processing system must determine if the ray 340 intersects an object within the scene. If the ray does not intersect an object within the scene it may be assigned a default background color (e.g., blue or black, representing the day or night sky). Conversely, as the ray 340 traverses through the three dimensional scene the ray 340 may strike objects. As the rays strike objects within the scene the color of the object may be assigned the pixel through which the ray passes. However, the color of the object must be determined before it is assigned to the pixel.

Many factors may contribute to the color of the object struck by the original ray 340. For example, light sources within the three dimensional scene may illuminate the object. Furthermore, physical properties of the object may contribute to the color of the object. For example, if the object is reflective or transparent, other non-light source objects may then contribute to the color of the object.

In order to determine the effects from other objects within the three dimensional scene, secondary rays may be issued from the point where the original ray 340 intersected the object. For example, one type of secondary ray may be a shadow ray. A shadow ray may be used to determine the contribution of light to the point where the original ray 340 intersected the object. Another type of secondary ray may be a transmitted ray. A transmitted ray may be used to determine what color or light may be transmitted through the body of the object. Furthermore, a third type of secondary ray may be a reflected ray. A reflected ray may be used to determine what color or light is reflected onto the object.

As noted above, one type of secondary ray may be a shadow ray. Each shadow ray may be traced from the point of intersection of the original ray and the object, to a light source within the three-dimensional scene 305. If the ray reaches the light source without encountering another object before the ray reaches the light source, then the light source will illuminate the object struck by the original ray at the point where the original ray struck the object.

For example, shadow ray $341_A$ may be issued from the point where original ray 340 intersected the object $320_A$, and may traverse in a direction towards the light source $325_A$. The shadow ray $341_A$ reaches the light source $325_A$ without encountering any other objects 320 within the scene 305. Therefore, the light source $325_A$ will illuminate the object $320_A$ at the point where the original ray 340 intersected the object $320_A$.

Other shadow rays may have their path between the point where the original ray struck the object and the light source blocked by another object within the three-dimensional scene. If the object obstructing the path between the point on the object the original ray struck and the light source is opaque, then the light source will not illuminate the object at the point where the original ray struck the object. Thus, the light source may not contribute to the color of the original ray and consequently neither to the color of the pixel to be rendered in the two-dimensional picture. However, if the object is translucent or transparent, then the light source may illuminate the object at the point where the original ray struck the object.

For example, shadow ray $341_B$ may be issued from the point where the original ray 340 intersected with the object $320_A$, and may traverse in a direction towards the light source $325_B$. In this example, the path of the shadow ray $341_B$ is blocked by an object $320_D$. If the object $320_D$ is opaque, then the light source $325_B$ will not illuminate the object $320_A$ at the point where the original ray 340 intersected the object $320_A$. However, if the object $320_D$ which the shadow ray is translucent or transparent the light source $325_B$ may illuminate the object $320_A$ at the point where the original ray 340 intersected the object $320_A$.

Another type of secondary ray is a transmitted ray. A transmitted ray may be issued by the image processing system if the object with which the original ray intersected has transparent or translucent properties (e.g., glass). A transmitted ray traverses through the object at an angle relative to the angle at which the original ray struck the object. For example, transmitted ray 344 is seen traversing through the object $320_A$ which the original ray 340 intersected.

Another type of secondary ray is a reflected ray. If the object with which the original ray intersected has reflective properties (e.g. a metal finish), then a reflected ray will be issued by the image processing system to determine what color or light may be reflected by the object. Reflected rays traverse away from the object at an angle relative to the angle at which the original ray intersected the object. For example, reflected ray 343 may be issued by the image processing system to determine what color or light may be reflected by the object $320_A$ which the original ray 340 intersected.

The total contribution of color and light of all secondary rays (e.g., shadow rays, transmitted rays, reflected rays, etc.) will result in the final color of the pixel through which the original ray passed.

Vector Operations

Processing images may involve performing one or more vector operations to determine, for example, intersection of rays and objects, generation of shadow rays, reflected rays, and the like. One common operation performed during image processing is the cross product operation between two vectors. A cross product may be performed to determine a normal vector from a surface, for example, the surface of a primitive of an object in a three dimensional scene. The normal vector may indicate whether the surface of the object is visible to a viewer.

Figures 4, 5:
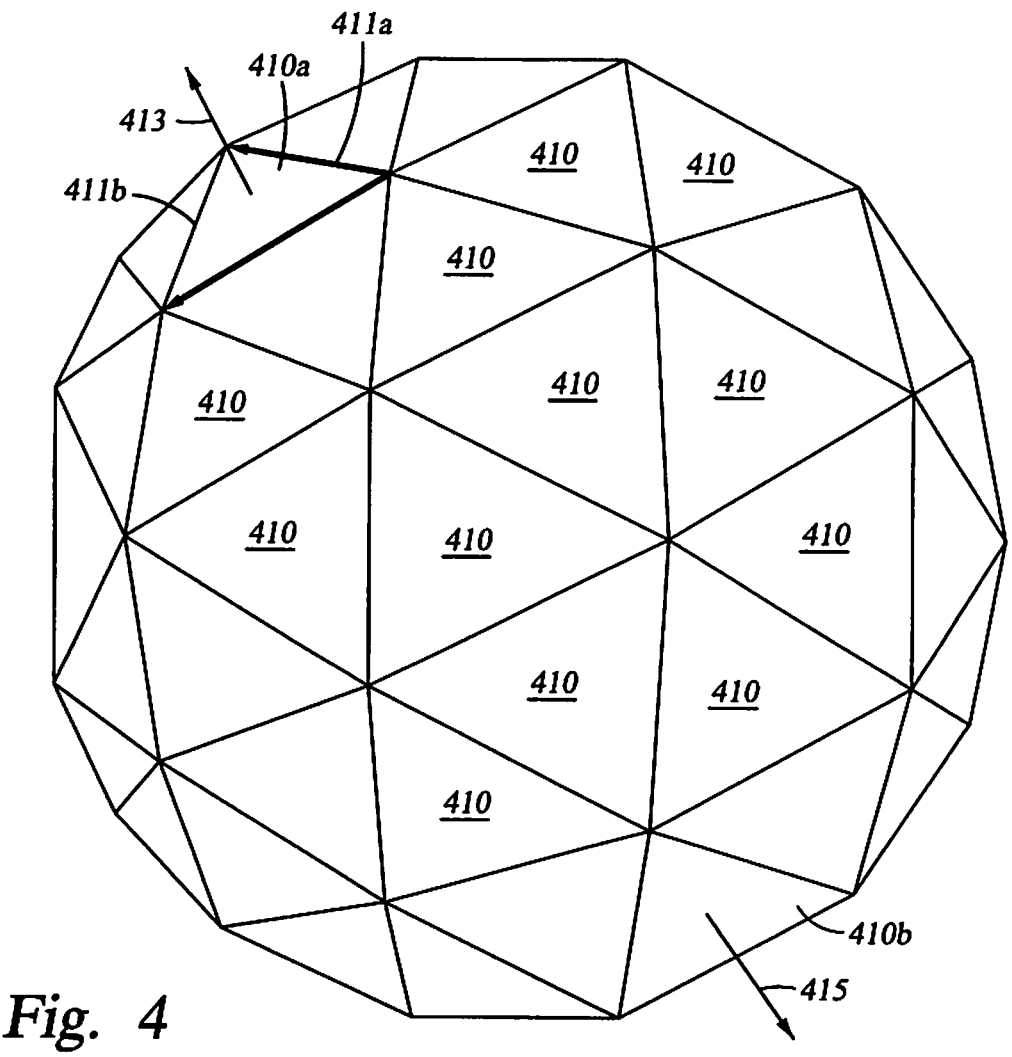
FIG. 4 illustrates a detailed view of an object to be rendered on a screen, according to an embodiment of the invention.
FIG. 5 illustrates a cross product operation.

As previously described, each object in a scene may be represented as a plurality of primitives connected to one another to form the shape of the object. For example, in one embodiment, each object may be composed of a plurality of interconnected triangles. FIG. 4 illustrates an exemplary object 400 composed of a plurality of triangles 410. Object 400 may be a spherical object, formed by the plurality of triangles 410 in FIG. 4. For purposes of illustration a crude spherical object is shown. One skilled in the art will recognize that the surface of object 400 may be formed with a greater number of smaller triangles 410 to better approximate a curved object.

In one embodiment of the invention, the surface normal for each triangle 410 may be calculated to determine whether the surface of the triangle is visible to a viewer 450. To determine the surface normal for each triangle, a cross product operation may be performed between two vectors representing two sides of the triangle. For example, the surface normal 413 for triangle 410a may be computed by performing a cross product between vectors 411a and 411b.

The normal vector may determine whether a surface, for example, the surface of a primitive, faces a viewer. Referring to FIG. 4, normal vector 413 points in the direction of viewer 450. Therefore, triangle 410 may be displayed to the user. On the other hand, normal vector 415 of triangle 410b points away from viewer 450. Therefore, triangle 410b may not be displayed to the viewer.

FIG. 5 illustrates a cross product operation between two vectors A and B. As illustrated, vector A may be represented by coordinates $[x_a, y_a, z_a]$, and vector B may be represented by coordinates $[x_b, y_b, z_b]$. The cross product A×B results in a vector N that is perpendicular (normal) to a plane comprising vectors A and B. The coordinates of the normal vector, as illustrated are $[(y_a z_b - y_b z_a), (z_b z_a - x_a z_b), (x_a y_b - x_b y_a)]$. One skilled in the art will recognize that vector A may correspond to vector 411a in FIG. 4, vector B may correspond to vector 411b, and vector N may correspond to normal vector 413.

Another common vector operation performed during image processing is the dot product operation. A dot product operation may be performed to determine rotation, movement, positioning of objects in the scene, and the like. A dot product operation produces a scalar value that is independent of the coordinate system and represents an inner product of the Euclidean space. The equation below describes a dot product operation performed between the previously described vectors A and B:

$$A \cdot B = x_a \cdot x_b + y_a \cdot y_b + z_a \cdot z_b$$

Hardware Support for Performing Vector Operations

As described earlier, a vector throughput engine (VTE), for example VTE 210 in FIG. 2, may perform operations to determine whether a ray intersects with a primitive, and determine a color of a pixel through which a ray is passed. The operations performed may include a plurality of vector and scalar operations. Accordingly, VTE 210 may be configured to issue instructions to a vector unit for performing vector operations.

Figure 6:
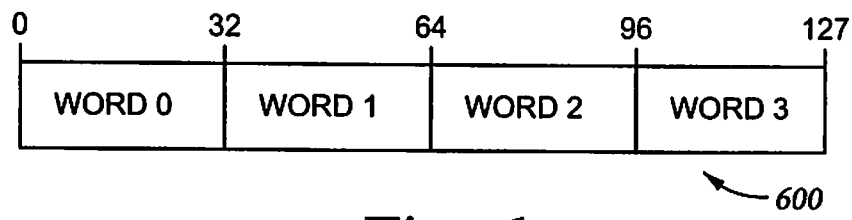
FIG. 6 illustrates a register according to an embodiment of the invention.

Vector processing may involve issuing one or more vector instructions. The vector instructions may be configured to perform operations involving one or more operands in one or more registers. The one or more registers may be a part of a register file associated with a vector unit. FIG. 6 illustrates an exemplary register 600 comprising one or more operands. As illustrated in FIG. 6, each register in the register file may comprise a plurality of sections, wherein each section comprises an operand.

In the embodiment illustrated in FIG. 6, register 600 is shown as a 128 bit register. Register 600 may be divided into four 32 bit word sections: word 0, word 1, word 2, and word 3, as illustrated. Word 0 may include bits 0-31, word 1 may include bits 32-63, word 2 may include bits 64-97, and word 3 may include bits 98-127, as illustrated. However, one skilled in the art will recognize that register 600 may be of any reasonable length and may include any number of sections of any reasonable length.

Each section in register 600 may include an operand for a vector operation. For example, register 600 may include the coordinates and data for a vector, for example vector A of FIG. 5. Accordingly, word 0 may include coordinate $x_a$, word 1 may include the coordinate $y_a$, and word 2 may include the coordinate $z_a$. Word 3 may include data related to a primitive associated with the vector, for example, color, transparency, and the like. In one embodiment, word 3 may be used to store scalar values. The scalar values may or may not be related to the vector coordinates contained in words 0-2.

Figure 7:
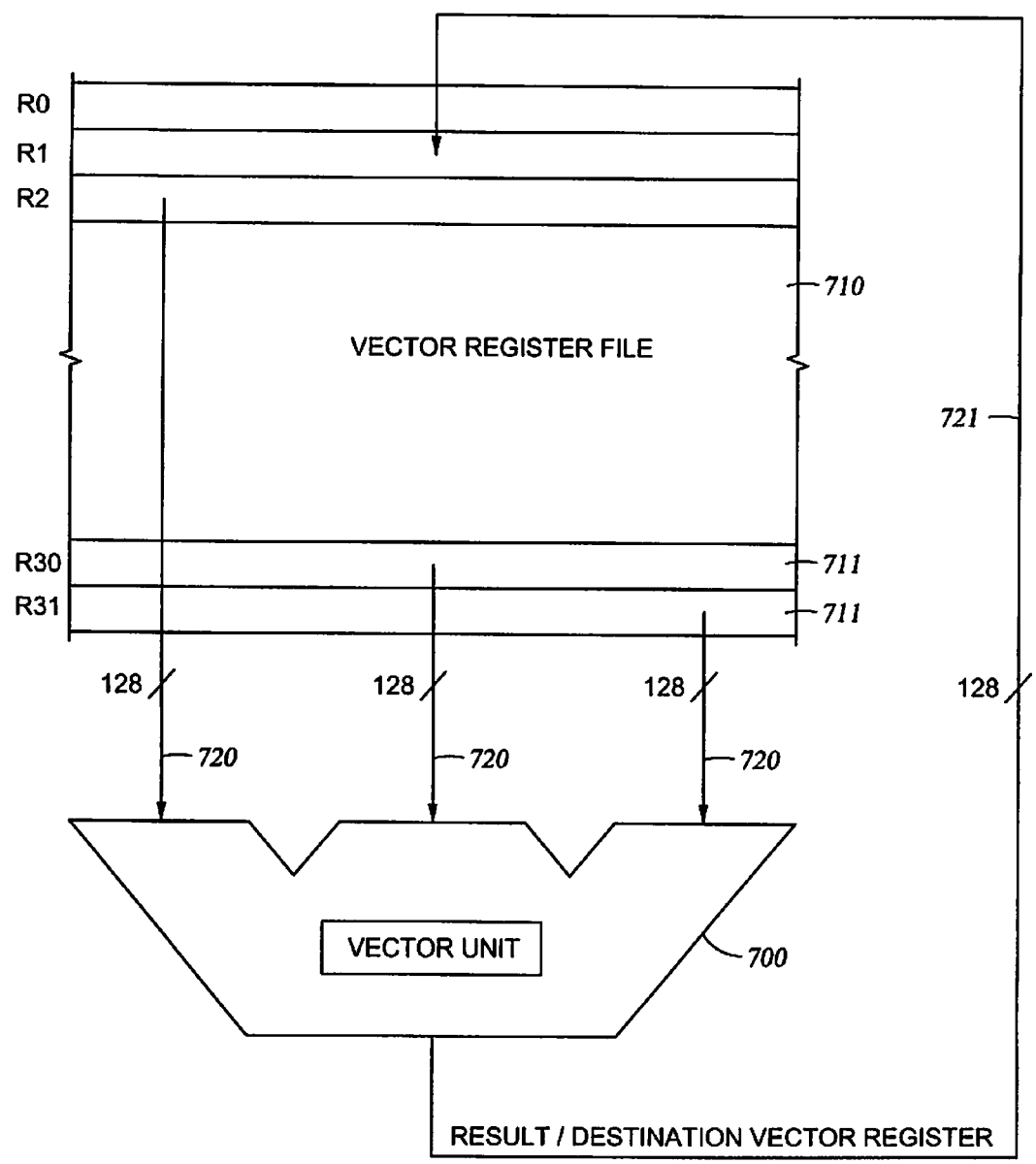
FIG. 7 illustrates a vector unit and a register file, according to an embodiment of the invention.

FIG. 7 illustrates an exemplary vector unit 700 and an associated register file 710. Vector unit 700 may be configured to execute single instruction multiple data (SIMD) instructions. In other words, vector unit 700 may operate on one or more vectors to produce a single scalar or vector result. For example, vector unit 700 may perform parallel operations on data elements that comprise one or more vectors to produce a scalar or vector result.

A plurality of vectors operated on by the vector unit may be stored in register file 710. For example, in FIG. 7, register file 710 provides 32 128-bit registers 711 (R0-R31). Each of the registers 711 may be organized in a manner similar to register 600 of FIG. 6. Accordingly, each register 711 may include vector data, for example, vector coordinates, pixel data, transparency, and the like. Data may be exchanged between register file 710 and memory, for example, cache memory, using load and store instructions. Accordingly, register file 710 may be communicably coupled with a memory device, for example, a Dynamic Random Access memory (DRAM) device and or a cache (SRAM) device.

A plurality of lanes 720 may connect register file 710 to vector unit 700. Each lane may be configured to provide input from a register file to the vector unit. For example, in FIG. 7, three 128 bit lanes connect the register file to the vector unit 700. In this manner, the contents of any 3 registers from register file 710 may be provided to the vector unit at a time.

The results of an operation performed by the vector unit may be written back to register file 710. For example, a 128 bit lane 721 provides a write back path to write results computed by vector unit 700 back to any one of the registers 711 of register file 710.

Figure 8:
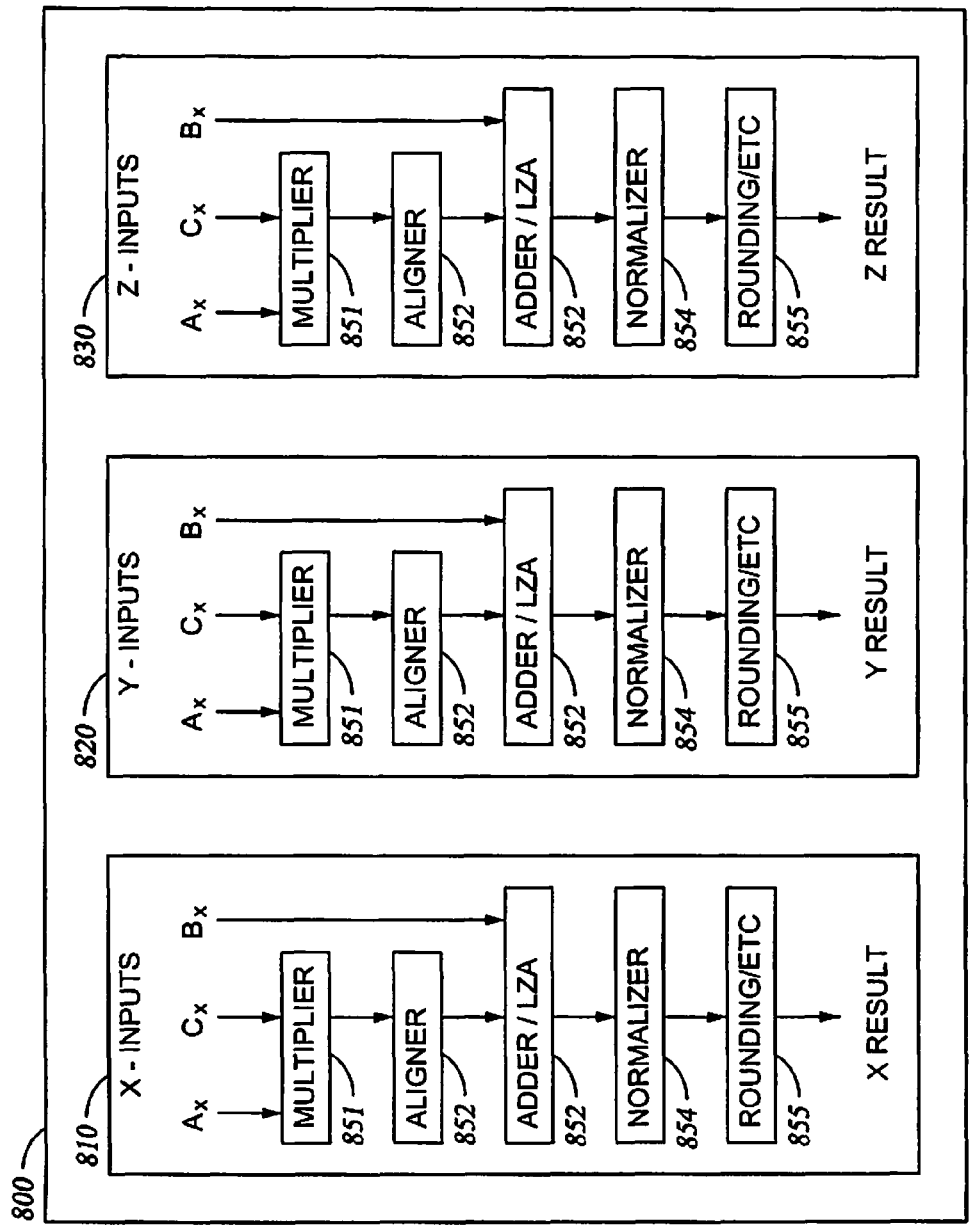
FIG. 8 illustrates a detailed view of a vector unit according to an embodiment of the invention.

FIG. 8 illustrates a detailed view of a vector unit 800. Vector unit 800 is an embodiment of the vector unit 700 depicted in FIG. 7. As illustrated in FIG. 8, vector unit 800 may include a plurality of processing lanes. For example, three processing lanes 810, 820, and 830 are shown in FIG. 8. Each processing lane may be configured to perform an operation in parallel with one or more other processing lanes. For example, each processing lane may multiply a pair of operands to perform a cross product or dot product operation. By multiplying different pairs of operands in different processing lanes of the vector unit, vector operations may be performed faster and more efficiently.

In one embodiment of the invention, one or more processing lanes of vector unit 800 may be configured to perform scalar operations. Therefore, vector unit 800 may be configured to perform both scalar and vector operations. For example, in one embodiment, vector unit 800 may include four processing lanes, wherein three processing lanes are configured to perform vector operations and one processing lane is configured to perform scalar operations.

Each processing lane may be pipelined to further improve performance. Accordingly, each processing lane may include a plurality of pipeline stages, with each stage performing one or more operations on the operands. For example, each vector lane may include a multiplier 851 for multiplying a pair of operands 830 and 831. Operands 830 and 831 may be derived from one of the lanes coupling the register file with the vector unit, for example, lanes 720 in FIG. 7. In one embodiment of the invention, the multiplication of operands may be performed in a first stage of the pipeline as illustrated in FIG. 8.

Each processing lane may also include an aligner for aligning the product computed by multiplier 851. For example, an aligner 852 may be provided in each processing lane. Aligner 852 may be configured to adjust a decimal point of the product computed by a multiplier 851 to a desirable location in the result. For example, aligner 852 may be configured to shift the bits of the product computed multiplier 851 by one or more locations, thereby putting the product in desired format. While alignment is shown as a separate pipeline stage in FIG. 8, one skilled in the art will recognize that the multiplication and alignment may be performed in the same pipeline stage.

Each processing lane may also include an adder 853 for adding two or more operands. In one embodiment (illustrated in FIG. 8), each adder 853 is configured to receive the product computed by a multiplier, and add the product to another operand 832. Operand 832, like operands 830 and 831, may be derived from one of the lanes connecting the register file to the vector unit. Therefore, each processing lane may be configured to perform a multiply-add instruction. One skilled in the art will recognize that multiply-add instructions are frequently performed in vector operations. Therefore, by performing several multiply add instructions in parallel lanes, the efficiency of vector processing may be significantly improved.

Each vector processing lane may also include a normalizing stage and a rounding stage, as illustrated in FIG. 8. Accordingly, a normalizer 854 may be provided in each processing lane. Normalizer 854 may be configured to represent a computed value in a convenient exponential format. For example, normalizer may receive the value 0.0000063 as a result of an operation. Normalizer 854 may convert the value into a more suitable exponential format, for example, $6.3 \times 10^{-6}$. The rounding stage may involve rounding a computed value to a desired number of decimal points. For example, a computed value of 10.5682349 may be rounded to 10.568 if only three decimal places are desired in the result. In one embodiment of the invention the rounder may round the least significant bits of the particular precision floating point number the rounder is designed to work with.

One skilled in the art will recognize that embodiments of the invention are not limited to the particular pipeline stages, components, and arrangement of components described above and in FIG. 8. For example, in some embodiments, aligner 852 may be configured to align operand 832, a product computed by the multiplier, or both. Furthermore, embodiments of the invention are not limited to the particular components described in FIG. 8. Any combination of the illustrated components and additional components such as, but not limited to, leading zero adders, dividers, etc. may be included in each processing lane.

In one embodiment of the invention, one or more vector units may be coupled with a register file. For example, in one embodiment, two vector units may be coupled with the register file. Each vector unit may be configured to independently and simultaneously process vector and scalar instructions. In one embodiment, one or more resources in a first vector unit may be shared with a second vector unit to process an instruction, for example, a cross product instruction.

Permute Instructions

As previously described, executing a vector instruction may involve performing a plurality of operations on one or more vector elements in one or more processing lanes of the vector unit. For example, each lane of the vector unit may perform an operation on one or more vector elements. The vector elements on which the operation is performed may depend on the location of the elements in one or more registers specified by the instruction. Therefore, vector elements may be arranged in appropriate locations in source registers prior to executing an instruction.

FIG. 9A illustrates exemplary source registers RA and RB, comprising the vector elements for two vectors A and B, for example vectors A and B of FIG. 5. As illustrated in FIG. 9A, register $R_A$ may comprise vector operand $x_a$ in its word 0 location, operand $y_a$ in its word 1 location, and operand $z_a$ in its word 2 location. Similarly, register $R_B$ may comprise vector operand $x_b$ in its word 0 location, operand $y_b$ in its word 1 location, and operand $z_b$ in its word 2 location. The data in the word 3 location of register $R_A$ and $R_B$ is shown as "don't-care" data, and is therefore depicted as XX.

Vector processing may involve performing a wide variety of operations, for example, cross products, dot products, vector addition, and the like. For example, in one embodiment vectors A and B may be added to one another. Accordingly, an add instruction identifying registers $R_A$ and $R_B$ may be issued to a vector unit. The vector unit may be configured to add the two vectors by adding elements of vectors A and B contained in registers $R_A$ and $R_B$. For example, referring back to FIG. 7, the contents of registers $R_A$ and $R_B$ may be transferred to the vector unit via lanes 720 to one or more processing lanes of the vector unit.

A first processing lane of the vector unit may add vector elements in the word 0 locations of register $R_A$ and $R_B$, a second processing lane may add vector elements in the word 1 locations of $R_A$ and $R_B$, and a third processing lane may add vector elements in the word 2 locations of $R_A$ and $R_B$. The result of the add instruction may be stored in register $R_C$, shown in FIG. 9A. For example, referring back to FIG. 7, the results of the add instruction may be written back to register $R_C$ in register file 710 via lane 721. As illustrated, register $R_C$ may include elements $x_c$, $y_c$, and $z_c$, wherein $x_c$ is the sum of $x_a$ and $x_b$, $y_c$ is the sum of $y_a$ and $y_b$, and $z_c$ is the sum of $z_a$ and $z_b$.

One problem with executing vector instructions is that vector elements may not be arranged in the appropriate locations in a register. In some embodiments, vector elements may be contained in different locations in different registers. FIG. 9B illustrates vector elements of vectors A and B spread across various locations and in various registers of a register file 900.

For example, element $x_a$ is contained in the word 3 location of register R7, element $y_a$ is contained in the word 2 location of register R3, and element $z_a$ is contained in the word 0 location of register R1. Therefore, the elements of vector A may require arrangement into a single register, as shown, for example, in register $R_A$ of FIG. 9A, wherein $x_a$ is contained in the word 0 location, $y_a$ is contained in the word 1 location and $z_a$ is contained in the word 2 location.

A variety of permute instructions may be issued to rearrange and transfer vector elements in a plurality of registers to achieve a desired configuration of the vector elements in one or more registers. FIG. 10 illustrates an exemplary instruction stream to arrange the elements of vector A, shown in FIG. 9B, in appropriate locations of a single register $R_A$.

As illustrated a first permute instruction 1001 may move $z_a$ from the word 0 location in register R1 (see FIG. 9B) into a temporary register T1. Similarly, instruction 1002 may move $y_a$ from the word 2 location in register R3 into a temporary register T2, and instruction 1003 may move $x_a$ from the word 3 location in R7 into a temporary register T3. Subsequently, a merge instruction 1004 may be issued to merge the contents of registers T2 and T3, and store the merged contents in register $R_A$. As a result of the merge instruction, register $R_A$ may contain $x_a$ in its word 0 location and $y_a$ in its word 1 location.

A second merge instruction 1005 may be issued to merge the contents of registers $R_A$ and T1. The second merge instruction may transfer $z_a$ into the word 2 location of $R_A$. Therefore, the elements of vector A may be arranged in register $R_A$ as shown in FIG. 9A. Similar instructions may be issued arrange elements of vector B in register $R_B$ as shown in FIG. 9A.

As previously discussed, execution of instructions, for example, instructions 1001-1004 may be pipelined to improve performance. However, dependencies between the instructions may require pipeline stalls. For example, instruction 1004 may be dependent on instructions 1002 and 1003. The dependency may exist because the transfer of elements $x_a$ and $y_a$ into appropriate locations in registers T2 and T3 must be completed before the contents of registers T2 and T3 can be merged. Therefore, one or more pipeline stages may be stalled to allow completion of instructions 1002 and 1003 before execution of instruction 1004 begins.

Similarly, instruction 1005 may be dependant on instruction 1004. This dependency may exist because both instructions 1004 and 1005 access the same register $R_A$. Therefore, operation on register $R_A$ by instruction 1004 may be allowed to complete before operations on register $R_A$ by instruction 1005 begin. Accordingly, the pipeline may be stalled between instructions 1004 and 1005.

Permute Instructions with Write Mask

In one embodiment of the invention, permute instructions may include as an operand a write mask to identify a particular location of a desired register in which to write an identified word. Therefore, the number of permute instructions and the number of temporary registers required to rearrange vector elements may be significantly reduced.

FIG. 11 illustrates an exemplary permute instruction with a write mask operand according to an embodiment of the invention. As illustrated, the instruction may include an op-code field 1101, one or more source register fields (two source register fields 1102 and 1103 are shown), a target register field 1104 and a mask field 1105. The register fields may comprise any suitable number of bits to specify source and target registers, and the exact number of bits may depend on the number of registers in a particular system architecture. For example, 5-bit register fields may be used to specify one of 32 source and target registers, while 7-bit register fields may be used to specify one of 128 source and target registers.

Mask field 1105 may specify one or more locations within the target register identified in field 1104 in which data may be stored. For example, in one embodiment, mask field 1105 may identify a word location, for example, word 0, word 1, word 2, word 3, and the like, where the results may be stored. In one embodiment, mask field 1105 may include a single bit for each identifiable field in the target register. For example, in one embodiment, the mask field may include four bits to identify four word locations. For example, a first bit may be associated with word location 0, a second bit with word location 1, a third bit with word location 2, and a fourth bit with word location 3.

Accordingly, if a mask bit is enabled, the data may be written to the word location associated with the bit. For example, in one embodiment, the mask may be set to 0001, wherein logic '0' may denote a disabled bit and logic '1' may denote an enabled bit. Because the fourth logic bit is enabled, results may be written to word 3 of the target register. If, instead, the mask bit was set to 1111, the results may be written to all word locations in the target register. One skilled in the art will recognize that the enablement logic may be reversed, wherein logic '0' denotes an enabled bit and logic '1' denotes a disabled bit.

One skilled in the art will further recognize that while a mask comprising four bits is described herein, embodiments of the invention are not limited as such. More generally, any number of mask bits may be used to specify any number of locations within the target register. For example, 8 mask bits may be used to identify 8 half word locations or 16 mask bits to specify 16 byte locations in a 128 bit register, and so on.

Furthermore, the particular instruction configuration depicted in FIG. 11 is not limiting on the invention. The permute instruction may include any number of fields of any length, each field being provided for a predefined purpose, for example, providing an extended op-code field, providing a field for identifying a location in the source register for source data, and the like. More generally, any instruction providing a mask field 1105 for identifying one or more locations of a target register falls within the scope of the invention.

FIG. 12 illustrates an exemplary instruction stream to arrange the elements of vector A, shown in FIG. 9B, in appropriate locations of a single register $R_A$ using permute instructions with write masks. As illustrated, a first permute instruction 1201 may transfer data from register R1 directly to register $R_A$. Mask 1210, may determine a location in register RA to which data from register R1 will be stored. For example, mask 1210 has a third bit enabled, which may correspond to word 2 of register $R_A$. Therefore, the contents from register R1, for example, $z_a$ may be transferred to word 0 of register $R_A$.

The mask bits may be sent directly to a vector unit during execution of the instruction. The mask bits may flow down the pipeline of the vector unit and may be used to create write enables when writing data back to the target register. For example, referring back to FIG. 7, the write enables may determine the data written back to the target register in the register file via path 721.

Similarly, permute instruction 1202 may transfer data, for example, $y_a$ from register R3 to the word 1 location in register $R_A$, and permute instruction 1203 may transfer data, for example $x_a$, from register R7 to the word 0 location in register $R_A$. Therefore, arrangement of the vector A elements in register $R_A$ may be accomplished with fewer instructions and without the use of temporary registers when compared to the instruction stream shown in FIG. 10. Furthermore, instructions 1201-1203 are not dependent, thereby avoiding stalling of the pipeline between instructions.

Figure 13:
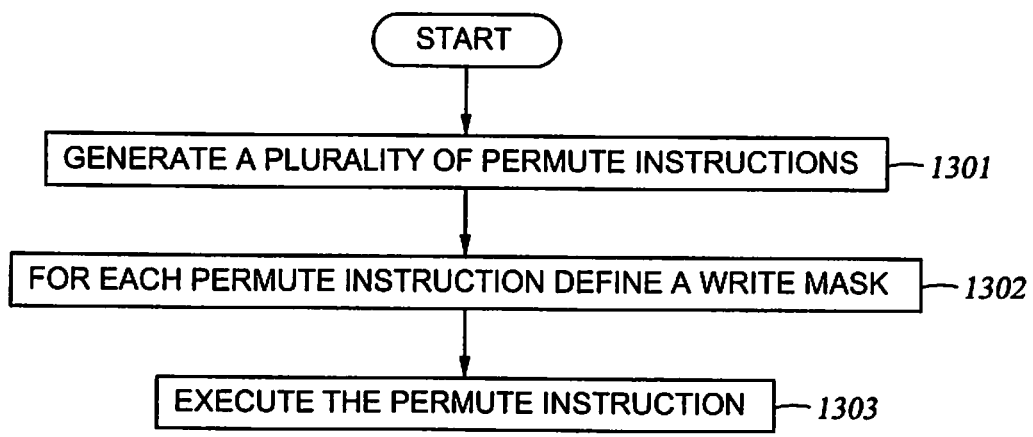
FIG. 13 is a flow diagram of exemplary operations performed to arrange data in particular locations of a target register, according to an embodiment of the invention.

FIG. 13 is a flow diagram of exemplary operations performed to arrange data at particular locations in a target register. The operations may begin in step 1301 by generating a plurality of permute instructions for transferring data from a plurality source registers to a target register. For example, each permute instruction may transfer data from one or more source registers to a target register.

In step 1302, a write mask may be defined for each permute instruction. The write mask may determine one or more locations in the target to which data from the source register may be written. In step 1303, the permute instructions may be executed by a vector unit to arrange the data from the plurality of source registers into desired locations in the target register. In one embodiment of the invention, the permute instructions may involve constructing a vector in the target register by transferring one or more vector operands from a plurality source registers to the target register.

Conclusion

By providing a permute instruction which allows the specification of a particular location of a target register in which to move data, embodiments of the invention significantly reduce the number of instructions, dependencies between instructions, and the usage of temporary registers during vector processing, thereby improving performance.

While the foregoing is directed to embodiments of the present invention, other and further embodiments of the invention may be devised without departing from the basic scope thereof, and the scope thereof is determined by the claims that follow.

What is claimed is:

1. A computer-implemented method to reduce pipeline stalls during a ray tracing operation involving a fragmented vector, by transferring the fragmented vector into a target register via non-interdependent permute instructions specifying the same operation code (op-code) but different write mask operands, the computer-implemented method comprising:

receiving a plurality of permute instructions each containing an op-code field and a plurality of operand fields, the plurality of operand fields including a first operand field comprising a respective source register, a second operand field comprising the target register, and a third operand field comprising a write mask, wherein the plurality of permute instructions specify the same op-code but different write masks, of which each write mask identifies a different word location, of the target register, to write to;

transferring the fragmented vector into the target register such that the target register stores the fragmented vector in unfragmented form, via non-interdependent permute instructions specifying the same op-code but different write mask operands, by executing each of the plurality of permute instructions by operation of one or more computer processors, wherein the vector stored in unfragmented form defines an edge of a first of a plurality of interconnected triangles representing at least part of an object in a three-dimensional scene of a virtual environment; and determining whether each of the plurality of interconnected triangles is visible from a viewing perspective, by performing one or more vector operations based on the vector stored in unfragmented form in the target register, whereafter at least a first of the plurality of interconnected triangles, determined to be visible from the viewing perspective, is output.

2. The computer-implemented method of claim 1, further comprising enabling one or more of a plurality of bits, each bit of which represents a different word location of the target register, in order to identify the respective word location of the target register.

3. The computer-implemented method of claim 2, wherein enabling one or more of the plurality of bits comprises setting the one or more bits to logic '1'.

4. The computer-implemented method of claim 2, wherein the one or more word locations of the target register are data word locations each storing a respective vector element.

5. A computer-implemented method to reduce pipeline stalls during a ray tracing operation involving a fragmented vector, by transferring the fragmented vector into a target register via non-interdependent permute instructions specifying the same operation code (op-code) but different write mask operands, the computer-implemented method comprising:

generating a plurality of permute instructions each containing an op-code field and a plurality of operand fields, the plurality of operand fields including a first operand field comprising a respective source register and a second operand field comprising the target register;

for each of the generated plurality of permute instructions, setting a third of the plurality of operand fields of the respective permute instruction, to a respective write mask, wherein the plurality of permute instructions specify the same op-code but different write masks, of which each write mask identifies a different word location, of the target register, to write to;

transferring the fragmented vector into the target register such that the target register stores the fragmented vector in unfragmented form, via non-interdependent permute instructions specifying the same op-code but different write mask operands, by executing each of the plurality of permute instructions by operation of one or more computer processors, wherein the vector stored in unfragmented form defines an edge of a first of a plurality of interconnected triangles representing at least part of an object in a three-dimensional scene of a virtual environment; and determining whether each of the plurality of interconnected triangles is visible from a viewing perspective, by performing one or more vector operations based on the vector stored in unfragmented form in the target register, whereafter at least a first of the plurality of interconnected triangles, determined to be visible from the viewing perspective, is output.

6. The computer-implemented method of claim 5, further comprising enabling one or more of a plurality of bits, each bit of which represents a different word location of the target register, in order to identify the respective word location of the target register.

7. The computer-implemented method of claim 6, wherein enabling one or more of the plurality of bits comprises setting the one or more bits to logic '1'.

8. The computer-implemented method of claim 6, wherein the one or more word locations of the target register are data word locations each storing a respective vector element.

9. The computer-implemented method of claim 5, wherein the ray tracing operation includes the one or more vector operations, wherein the non-interdependent permute instructions are executable without pipeline stalls, wherein the op-code field is explicitly specified by the respective permute instruction as an op-code and not as any operand, wherein each of the plurality of operand fields is explicitly specified by the respective permute instruction as an operand and not as any op-code, wherein the fragmented vector is transferred into the target register such that the target register stores the fragmented vector in unfragmented form and only via the multiple permute instructions specifying the same op-code but different write mask operands;

wherein the fragmented vector is transferred into the target register via non-interdependent permute instructions specifying the same op-code but different write mask operands, without using any merge instructions and without using any temporary registers, wherein each of the plurality of permute instructions is executed in order to transfer data from a respective word location identified within the respective source register to the location in the target register identified by the respective write mask.

10. The computer-implemented method of claim 9, wherein each write mask comprises a plurality of bits, wherein each of the plurality of bits is associated with a different location in the target register, wherein each source register contains a respective plurality of data words, and wherein the target register contains a plurality of data words;

wherein a position of a data word location identified within the plurality of data words of at least one source register is different from a position of the location within the plurality of data words of the target register, thereby rearranging an order of data from the at least one source register to the target register;

wherein the one or more computer processors include a vector unit and a register file, the register file including the target register, wherein the vector unit supports a predefined instruction set, wherein the plurality of permute instructions is based on the predefined instruction set, wherein the fragmented vector is transferred into the target register by the vector unit, wherein the fragmented vector stored in unfragmented form comprises a first vector, wherein the target register comprises a first target register, wherein the computer-implemented method further comprises:

generating, by the vector unit, a second vector in a second target register in the register file, using a plurality of dot product instructions based on the predefined instruction set, without using any permute instructions, and without using any merge instructions.

11. The computer-implemented method of claim 10, wherein the edge comprises a first edge in the three-dimensional scene, wherein the second vector defines a second edge in the three-dimensional scene and is generated by performing an operation comprising:

generating the plurality of dot product instructions, each dot product instruction specifying: (i) at least one source register comprising vector operands for performing a dot product operation; and (ii) the second target register, wherein each dot product instruction generates a scalar result representing an operand of the second vector;

setting a mask field in each of the plurality of dot product instructions, wherein the mask field identifies one or more locations of the second target register for storing the scalar result of the dot product operation as at least one element of the second vector to be stored in the second target register; and determining at least one of rotation, movement, and positioning of the object in the three-dimensional scene, by executing the dot product instructions to store each operand of the second vector at the one or more locations in the second target register identified by the mask field to construct the second vector in the second target register.

12. The computer-implemented method of claim 11, further comprising enabling one or more of a plurality of bits, each bit of which represents a different word location of the second target register, in order to identify the respective word location of the second target register, wherein enabling one or more of the plurality of bits comprises setting the one or more bits to logic '1';

wherein each of the word locations comprise vector data, wherein the one or more word locations of the second target register are data word locations each storing a respective vector element.

13. The computer-implemented method of claim 12, wherein each triangle is defined by two associated vectors, wherein the first triangle is rendered only upon determining that the first triangle is visible from the viewing perspective, wherein at least a second triangle of the plurality of interconnected triangles is not rendered upon determining that the second triangle is not visible from the viewing perspective, wherein the one or more vector operations include:

determining a surface normal for the respective triangle by performing a cross product operation between the two vectors associated with the respective triangle; and determining that the respective triangle is visible based upon a determination that the surface normal for the respective triangle points toward a viewing entity having the viewing perspective.

14. The computer-implemented method of claim 13, wherein at least a first of the one or more computer processors includes: (i) a workload manager; (ii) a plurality of vector throughput engines; (iii) a cache shared between at least the plurality of vector throughput engines; and (iv) a plurality of inboxes comprising a memory mapped address space;

wherein the workload manager is configured to issue the plurality of permute instructions and the plurality of dot product instructions;

wherein the vector unit is configured to determine whether each triangle of the object in the three-dimensional scene is visible from the viewing perspective, wherein at least one of the plurality of vector throughput engines is the vector unit.

15. The computer-implemented method of claim 14, wherein the first computer processor includes a plurality of sub-processors, wherein the workload manager is further configured to communicate with at least one other workload manager via a bus, and wherein at least one vector throughput engine is further configured to communicate with a vector throughput engine of at least one computer processor other than the first computer processor;

wherein the vector unit is further configured to perform one or more intersection tests between a primary ray cast into the three-dimensional scene and at least one of the triangles of the object in the three-dimensional scene;

wherein the vector unit is further configured to determine a color for a pixel of a virtual plane, through which the primary ray is cast into the three-dimensional scene, based on at least a light source in the three-dimensional scene and based further on a color of the object;

wherein the color for the pixel of the virtual plane is further determined based on at least a secondary ray issued from a point at which the primary ray intersects the object in the three-dimensional scene, wherein the secondary ray comprises at least one of a shadow ray, a transmitted ray, and a reflected ray.

16. The computer-implemented method of claim 15, wherein a plurality of secondary rays are issued in the three-dimensional scene, wherein the plurality of secondary rays include a shadow ray, a transmitted ray, and a reflected ray, wherein a first secondary ray is issued from the point at which the primary ray intersects the object in the three-dimensional scene, wherein a second secondary ray is issued from a point at which the first secondary ray intersects a second object in the three-dimensional scene, wherein a third secondary ray is issued from a point at which the second secondary ray intersects a third object in the three-dimensional scene;

wherein the object comprises a first object, wherein the shadow ray is issued from an object to a light source in the three-dimensional scene, wherein the transmitted ray is issued from a second object having at least one of transparent properties and translucent properties, wherein the reflected ray is issued from a third object having reflective properties, wherein the color for the pixel of the virtual plane is determined based on the plurality of secondary rays.

17. A system to reduce pipeline stalls during a ray tracing operation involving a fragmented vector, by transferring the fragmented vector into a target register via non-interdependent permute instructions specifying the same operation code (op-code) but different write mask operands, the system comprising a plurality of processors communicably connected with one another, wherein each processor comprises:

a register file comprising a plurality of registers, wherein the plurality of registers includes a source register and a target register, wherein the source register contains a respective plurality of data words, wherein the target register contains a second plurality of data words; and at least one vector unit configured to:

receive a plurality of permute instructions each containing an op-code field and a plurality of operand fields, the plurality of operand fields including a first operand field comprising the source register, a second operand field comprising the target register, and a third operand field comprising a write mask, wherein the plurality of permute instructions specify the same op-code but different write masks, of which each write mask identifies a different word location, of the target register, to write to;

transfer the fragmented vector into the target register such that the target register stores the fragmented vector in unfragmented form, via non-interdependent permute instructions specifying the same op-code but different write mask operands, by executing each of the plurality of permute instructions, wherein the vector stored in unfragmented form defines an edge of a first of a plurality of interconnected triangles representing at least part of an object in a three-dimensional scene of a virtual environment; and determine whether each of the plurality of interconnected triangles is visible from a viewing perspective, by performing one or more vector operations based on the vector stored in unfragmented form in the target register, whereafter at least a first of the plurality of interconnected triangles, determined to be visible from the viewing perspective, is output.

18. The system of claim 17, wherein one or more of a plurality of bits, each bit of which represents a different word location of the target register, are enabled in order to identify the respective word locations of the target register.

19. The system of claim 18, wherein in order to enable the one or more bits, the one or more bits are set to logic '1'.

20. The system of claim 18, wherein the one or more locations of the target register are data word locations each storing a respective vector element.

* * * * *